(12) United States Patent
Shiroma (10) Patent No.: US 9,003,708 B2
(45) Date of Patent: Apr. 14, 2015

(54) MOVING BODY DRIVE APPARATUS

(71) Applicant: Fuji Electric Co., Ltd., Kawasaki-shi, Kanagawa-ken (JP)

(72) Inventor: Takahiro Shiroma, Nagano (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 14/171,830

(22) Filed: Feb. 4, 2014

(65) Prior Publication Data
US 2014/0238165 A1  Aug. 28, 2014

(30) Foreign Application Priority Data
Feb. 28, 2013 (JP) ................... 2013-039468

(51) Int. Cl.
 *F16H 21/40* (2006.01)
 *F16H 19/04* (2006.01)

(52) U.S. Cl.
 CPC ........... *F16H 19/04* (2013.01); *Y10T 74/18568* (2015.01); *E05Y 2900/531* (2013.01); *E05F 15/635* (2015.01)

(58) Field of Classification Search
 CPC ... F16H 19/04; E05F 15/142; E05Y 2900/531
 USPC .................... 49/360, 362, 409, 425
 See application file for complete search history.

(56) References Cited

U.S. PATENT DOCUMENTS

| | | | | |
|---|---|---|---|---|
| 832,010 A * | 9/1906 | Cossey | ............................ | 49/100 |
| 832,458 A * | 10/1906 | Cossey | ............................ | 49/116 |
| 1,023,723 A * | 4/1912 | Cossey | ............................ | 49/116 |
| 1,602,482 A * | 10/1926 | Fassnacht | ....................... | 49/275 |
| 1,776,163 A * | 9/1930 | Mayer | ............................... | 16/88 |
| 1,862,932 A * | 6/1932 | Home | ............................. | 49/362 |
| 1,917,415 A * | 7/1933 | Woodruff | ......................... | 49/100 |
| 1,997,175 A * | 4/1935 | Gussack | ......................... | 49/100 |
| 2,878,532 A * | 3/1959 | Clark | .............................. | 49/139 |
| 3,961,447 A * | 6/1976 | Wolz | .............................. | 49/362 |
| 4,541,202 A * | 9/1985 | Dockery | ......................... | 49/362 |
| 5,355,624 A * | 10/1994 | Bacon | ............................ | 49/280 |
| 5,388,370 A * | 2/1995 | Tonsmann | ...................... | 49/100 |
| 5,437,485 A * | 8/1995 | Goldschmidt | ................ | 292/142 |
| 6,398,327 B1 * | 6/2002 | Momoze | .................... | 312/319.1 |
| 6,585,303 B1 * | 7/2003 | Coose et al. | ................... | 292/144 |
| 7,350,332 B2 * | 4/2008 | Petridis et al. | .................. | 49/122 |
| 7,762,020 B2 * | 7/2010 | Petridis et al. | .................. | 49/120 |
| 8,272,165 B2 * | 9/2012 | Tomioka | ......................... | 49/275 |
| 2007/0251150 A1 * | 11/2007 | Harie | .............................. | 49/358 |

(Continued)

*Primary Examiner* — Katherine Mitchell
*Assistant Examiner* — Justin Rephann
(74) *Attorney, Agent, or Firm* — Manabu Kanesaka (57) ABSTRACT

A moving body drive apparatus drives a moving body in a linear direction by a drive source. The drive apparatus includes a relay rotating body moved in a traveling direction of the moving body by the drive source, and provided rotatably in a direction perpendicular to the traveling direction to relay drive power to the moving body; a rotation converting body arranged stationary relative to the moving body and engaging an outer circumference of the relay rotating body, for converting movement of the relay rotating body moved in the traveling direction into rotation; and a conveyance linear body adapted to be coupled to the moving body and engaging the outer circumference of the relay rotating body. The conveyance linear body moves in the traveling direction of the moving body by the relay rotating body rotating while being moved in the traveling direction of the moving body.

10 Claims, 8 Drawing Sheets

(56) References Cited

U.S. PATENT DOCUMENTS

| | | | |
|---|---|---|---|
| 2009/0266185 A1* | 10/2009 | Harie et al. | 74/29 |
| 2010/0188177 A1* | 7/2010 | Inage | 335/205 |
| 2010/0212229 A1* | 8/2010 | Kitabata | 49/362 |
| 2011/0308164 A1* | 12/2011 | Terasaki et al. | 49/360 |
| 2012/0060419 A1* | 3/2012 | Riggs | 49/18 |

* cited by examiner

FULLY OPEN STATE OF DOOR

OPENING AND CLOSING DIRECITON

OPENING DIRECTION ← → CLOSING DIRECTION

FULLY CLOSED STATE OF DOOR

MOVING BODY DRIVE APPARATUS

CROSS-REFERENCE TO RELATED APPLICATION

This application is based on, and claims priority from Japanese Patent Application No. 2013-039468 filed on Feb. 28, 2013, contents of which are incorporated herein by reference.

BACKGROUND OF THE INVENTION

1. Field of the Invention

The present invention relates to a moving body drive apparatus for automatically opening and closing a moving body such as a door of a vehicle.

2. Description of the Related Art

In a door opening and closing apparatus for a vehicle (called a "moving body drive apparatus" below), a device using a rack and pinion is a highly reliable system which causes few breakdowns and hardly requires any maintenance.

For example, in the case of a single sliding door for a railway carriage, or a double sliding door for same in which one door panel is opened and closed by a single moving body drive apparatus, a single rack having a length adjusted to approximately the full opening and closing length of the door is used in a door apparatus which uses a rotary motor. If this rack is formed into a sealed structure, then the length of the case of the moving body drive apparatus cannot be made shorter than two times the full opening and closing length of the door, due to the amount of movement of the rack.

FIGS. 7A and 7B and FIGS. 8A and 8B are schematic drawings of a conventional door apparatus 100 based on a moving body drive apparatus using a rack and pinion. In this moving body drive apparatus, a pinion fixed to a motor shaft is rotated in a corresponding direction, by rotation of the motor in either a forward or reverse direction, and a rack, which is installed so as to be engaged with the pinion, moves accordingly in either a leftward or rightward direction. A door is attached to the rack, and the door is opened and closed corresponding to the leftward and rightward movement of the rack.

Figure 7:
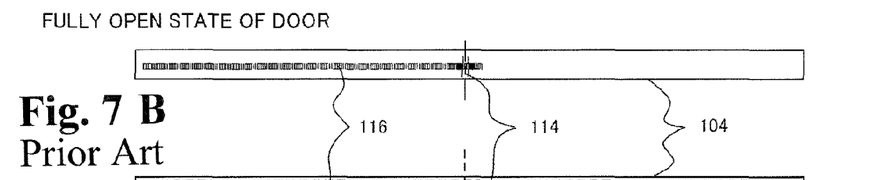
Figure 8:
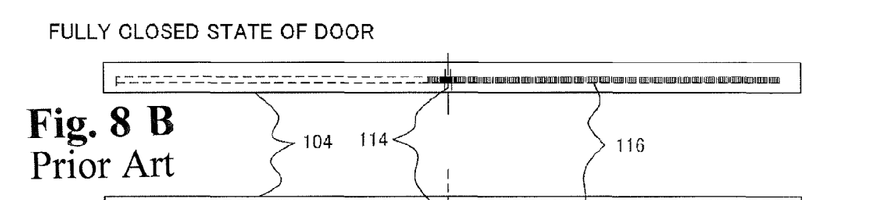

FIGS. 7A and 7B are diagrams showing a door in a fully open state, and FIGS. 8A and 8B are diagrams showing a door in a fully closed state. FIGS. 7A and 7B are respectively a front surface diagram and an upper surface diagram of the door apparatus 100 in a fully open state of the door. FIGS. 8A and 8B are respectively a front surface diagram and an upper surface diagram of the door apparatus 100 in a fully closed state.

The operation of the respective parts is now described with reference to FIG. 7A. The door apparatus 100 includes a door panel 102, a moving body drive apparatus to drive the door panel 102, a housing case 104, and a door rail 106 for guiding the door panel 102, and the like.

The moving body drive apparatus includes a drive motor (not illustrated), a pinion 114, a rack 116, a drive arm 108, and the like. The pinion 114 is fixed to one end of the output shaft of the drive motor, and is accommodated inside the housing case 104 together with a rack 116 which engages with the pinion 114. The pinion 114 is disposed near a central position of the housing case 104, in the opening and closing direction.

The rack 116 is a member which is long in the lateral direction and has a gear for engaging with the pinion 114 formed in an upper portion thereof. The rack 116 is provided movably in the opening and closing direction, by a rail, or the like, which is not illustrated. A drive arm 108 to drive the door panel 102 is provided downward on the bottom portion of the right end side of the rack 116. The door rail 106 is provided in the lower portion of the housing case 104 and has virtually the same total length as the housing case 104.

Door hangers 112 are provided on the left and right ends of the door panel 102. The door panel 102 is suspended movably on the door rail 106 via the left and right door hangers 112. Rollers 118 inserted smoothly into a rail groove 106a formed in the lower end portion of the door rail 106 and guiding the opening and closing movement of the door panel 102 are installed on the door hangers 112. A door coupling section 110 is provided in the right end upper section of the door panel 102 and a drive arm 108 is coupled with this door coupling section 110.

In this structure, when the pinion 114 is rotated in a counter-clockwise direction in the drawings, from the position in the open state shown in FIG. 7A, the rack 116 moves rightward and the door panel 102 which is coupled with the rack 116 via the drive arm 108 and the door coupling section 110 is moved to the position of the closed state shown in FIG. 8A.

As the rack 116 moves from the open position of the door panel 102 to the closed position, the rack 116 moves from the position shown in FIG. 7B to the position shown in FIG. 8B. A space approximately two times the length of the rack is required in the door apparatus 100, in order for the rack 116 to be able to move through approximately two times the length thereof (which corresponds to the amount of movement of the door panel). Furthermore, in order to hermetically seal the rack 116, the housing case 104 is also required to have a length approximately two times the length of the rack.

On the other hand, there is a requirement to make the door apparatus compact in size in order to make the vehicle compact and ensure the internal space, and in particular, it is necessary to shorten the length of the door apparatus in the opening and closing direction thereof. As one proposal for shortening the length of the moving body drive apparatus in the opening and closing direction, Japanese Patent Application Publication No. 2010-196254 proposes a moving body drive apparatus which shortens the length of the door apparatus in the opening and closing direction, by disposing two pinions at a prescribed distance apart and engaging the two pinions with a rack.

Figure 9:
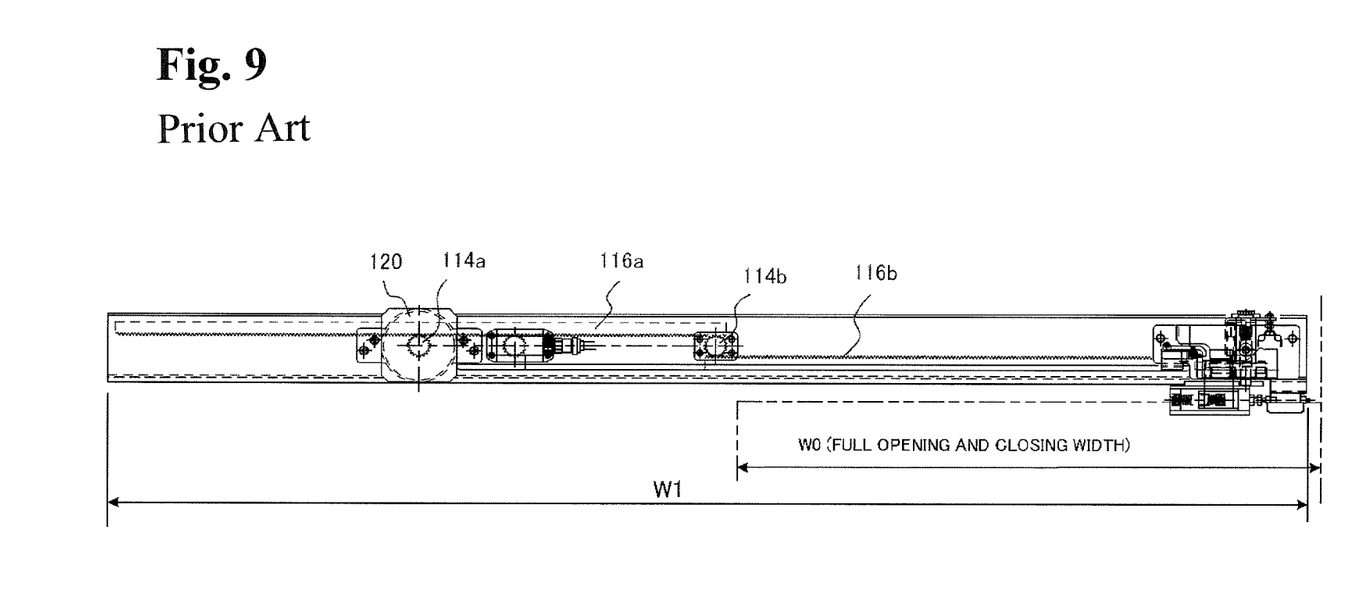
FIG. 9 is a diagram showing a concrete example based on a moving body drive apparatus proposed in Japanese Patent Application Publication No. 2010-196254.

FIG. 9 is a diagram showing a concrete example of the moving body drive apparatus proposed in Japanese Patent Application Publication No. 2010-196254. FIG. 9 shows a state where the door is in a right-side position and is closed. A second pinion 114b is provided at a position separated by a prescribed distance from a first pinion 114a which is installed on the drive shaft of a motor 120.

An upper rack 116a and a lower rack 116b are respectively provided movably in the left/right direction, on the upper side and the lower side of the housing case. A door panel is coupled to the lower rack 116b. The upper rack 116a is a relay rack for transmitting drive force from the first pinion 114a, to the second pinion 114b. One of the upper rack 116a and the lower rack 116b is provided so as to be engaged with the first pinion 114a at all times.

In a state where the door as shown in FIG. 9 has been opened half-way from the fully closed state, the upper rack 116a is engaged with both the first pinion 114a and the second pinion 114b, and the lower rack 116b is moved leftwards due to engagement with the second pinion 114b. When the lower rack 116b moves leftwards and has moved more than half-way to the left, then the engagement between the upper rack 116a and the first pinion 114a is released, the lower rack 116b is engaged directly with the first pinion 114a, and the lower rack 116b moves to a fully open state.

In a method based on a relationship in which the door moves through a distance corresponding to the length of the rack as in Japanese Patent Application Publication No. 2010-196254 shown in FIG. 9, supposing that the door moves through a distance corresponding to the width of the door, then the total length of the moving body drive apparatus will be approximately two times the length of the rack. In the example shown in FIG. 9, the total length W1 of the portion corresponding to the moving body drive apparatus is approximately two times the total opening and closing width W0. Since the opening and closing length of the vehicle door often exceeds 1 meter at present, the total length of the portion corresponding to the moving body drive apparatus is 2 meters or greater.

In a moving body drive apparatus having an enlarged size, there is no spare margin in the length direction of the head jamb, for instance, in an end door of a railway carriage, and therefore outfitting and layout are difficult to carry out. Therefore, the size of the structure, such as the vehicle is limited. Furthermore, if both ends of the rack are moved to a distance of two times the opening and closing distance of the whole door, then caution is also required in respect of interference between the attachment section of the vehicle, etc. and the rack after installation. As described above, from the viewpoint of the freedom of layout inside the vehicle and saving space, etc., there is a requirement to shorten the length of the moving body drive apparatus in the direction of movement.

SUMMARY OF THE INVENTION

In view of the abovementioned problems, it is an object of the present invention to provide a moving body drive apparatus having a shortened length in the direction of movement.

In order to achieve the abovementioned object, a door drive apparatus which opens and closes a door by a motor includes a relay pinion moved in an opening and closing direction by the motor and provided rotatably in a direction perpendicular to the opening and closing direction to relay a drive power to the door; a rotating rack provided so as to be stationary relative to the door and engaging with an outer circumference of the relay pinion to convert the movement of the relay pinion moved in the opening and closing direction into rotation; and a conveyance rack coupled to the door and engaging with the outer circumference of the relay pinion. The rotation of the relay pinion moves the conveyance rack in the opening and closing direction while being moved in the opening and closing direction.

According to the present invention, it is possible to provide a moving body drive apparatus having a shortened length in the direction of movement.

BRIEF DESCRIPTION OF THE DRAWINGS

FIGS. 1A and 1B are diagrams showing a fully opened state of the door apparatus 1 employing the moving body drive apparatus 2 according to an embodiment of the present invention, wherein FIG. 1A is a front surface diagram, and FIG. 1B is an upper surface diagram.

FIGS. 2A and 2B are diagrams showing a fully closed state of the door apparatus 1 employing the moving body drive apparatus 2 according to the present invention, wherein FIG. 2A shows a front surface diagram, and FIG. 2B shows an upper surface diagram.

FIGS. 3A to 3C are diagrams showing an enlarged view of a relay rack 13 and a relay pinion 12, wherein FIG. 3A is a front surface diagram in the same direction as FIG. 1A, FIG. 3B is an upper surface diagram in the same direction as the FIG. 1B, and FIG. 3C is a side face diagram.

FIGS. 4A and 4B are cross-sectional drawings of a power pinion 11 and a relay pinion 12, wherein

FIGS. 7A and 7B are diagrams illustrating a fully open state of a conventional door apparatus 100 using a rack and pinion, wherein FIGS. 7A and 7B are respectively a front surface diagram and an upper surface diagram of the door apparatus in a fully open state of the door.

FIGS. 8A and 8B are diagrams illustrating a fully closed state of a conventional door apparatus 100 using a rack and pinion, wherein FIGS. 8A and 8B are respectively a front surface diagram and an upper surface diagram of the door apparatus in a fully closed state.

DESCRIPTION OF THE PREFERRED EMBODIMENTS

Figure 1:
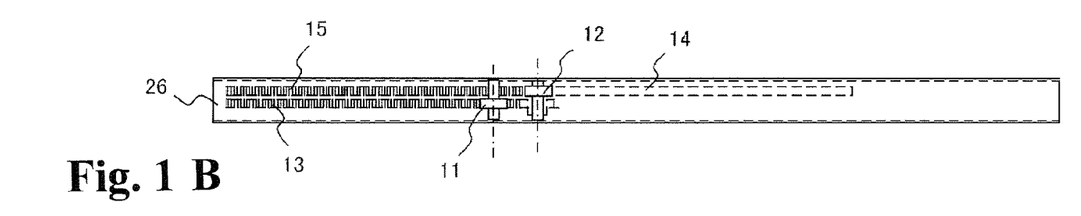

Below, embodiments of the present invention are described with reference to the drawings. FIGS. 1A, 1B and FIGS. 2A, 2B are diagrams respectively showing a door apparatus 1 employing a moving body drive apparatus 2 relating to an embodiment of the present invention. FIGS. 1A and 1B are diagrams showing a fully open state of the door apparatus 1. FIG. 1A is a front surface diagram and FIG. 1B is an upper surface diagram. The door is moved in the left/right direction in FIGS. 1A and 1B, which is referred to as the opening and closing directions. Furthermore, the up/down direction in FIG. 1A is called the height direction (Z direction).

The door apparatus 1 includes a moving body drive apparatus 2, a door unit 4 which is the moving body that is moved by the moving body drive apparatus 2, and a door rail 50 which holds the door unit 4 movably. The moving body drive apparatus 2 drives the door unit 4 in a linear direction and causes the door unit 4 to advance, taking the leftward direction in FIGS. 1A and 1B as an opening direction and rightward direction in FIGS. 1A and 1B as a closing direction.

The moving body drive apparatus 2 includes a power pinion 11, a relay pinion 12, a relay rack 13, a conversion rack 14, a conveyance rack 15, a drive arm 16, and a housing case 26.

The power pinion 11 is a powered rotating body which transmits motive power from a drive source (motor) which is described below, to the moving body drive apparatus 2. The power pinion 11 has a cylindrical shape and has a gear formed on the whole outer circumferential surface thereof.

The relay rack 13 is a member that is engaged with the power pinion 11 and is moved in the opening and closing direction by the rotation of the power pinion 11. Furthermore, the relay rack 13 holds the relay pinion 12 rotatably, and thereby moves the relay pinion 12 in the opening and closing direction of the door unit 4.

More specifically, the relay rack 13 is a linear member which is long and thin in the opening and closing direction, and has a rack formed in the upper surface thereof; the lower side of the gear on the power pinion 11 engages with the rack. The relay pinion 12 is installed rotatably on the right end upper portion of the relay rack 13. The installation structure of the relay pinion 12 is illustrated in detail in FIGS. 3A to 3C and FIGS. 4A and 4B. The relay rack 13 is provided movably in the opening and closing direction by a sliding mechanism (nod illustrated), inside the housing case 26 which is described below. The relay rack 13 is also called a relay linear body.

The relay pinion 12 is installed rotatably on the relay rack 13, and moves in the opening and closing direction in an integrated fashion with the relay rack 13. The relay rack 13 has a cylindrical shape and has a gear formed about the whole outer circumferential surface thereof. The relay pinion 12 rotates while moving in the opening and closing direction of the door unit 4, and relays drive force to the door unit 4; the relay pinion 12 is also called a relay rotating body. Furthermore, the relay pinion 12 is provided so as to be positioned near to the right side of the power pinion 11, when in a fully open state.

The conversion rack 14 is provided so as to be stationary relative to the door unit 4, and engages with the relay pinion 12 to convert the movement of the relay pinion 12 into rotation of the relay pinion 12. More specifically, the conversion rack 14 is a linear member which is long and thin in the opening and closing direction and has a rack formed on the lower surface side. The conversion rack 14 is fixed on the upper portion of the housing case 26, so as to be arranged parallel to the relay rack 13 in a position to the far side thereof. The gear on the upper side of the relay pinion 12 engages with the rack of the conversion rack 14, and consequently the relay pinion 12 moving in the opening and closing direction is caused to rotate. The conversion rack 14 converts the linear movement of the relay pinion 12 into rotation, and is also called a rotation converting body.

The conveyance rack 15 is coupled to the door unit 4 and engages with the gear of the relay pinion 12 which rotates while moving in the opening and closing direction, whereby the conveyance rack 15 is moved in the opening and closing direction by the relay pinion 12. More specifically, the conveyance rack 15 is a linear member which is long and thin in the opening and closing direction, and has a rack formed on the upper surface side thereof. The conveyance rack 15 is installed movably by a sliding mechanism (not illustrated) on the lower portion of the housing case 26, so as to be arranged parallel to the relay rack 13 in a position to the far side thereof.

The conveyance rack 15 is provided so as to sandwich the relay pinion 12 in conjunction with the conversion rack 14, from the upper and lower sides (in the height direction). The lower-side gear of the relay pinion 12 engages with the rack of the conveyance rack 15, and the conveyance rack 15 moves in the opening and closing direction in accordance with the rotation of the relay pinion 12.

The conveyance rack 15 conveys the door unit 4 in the opening and closing direction by the relay pinion 12, and may be called a conveyance linear body. Moreover, the conveyance rack 15 is driven both by linear movement and rotation of the relay pinion 12, and the amount of movement of the conveyance rack 15 is two times the amount of movement of the relay rack 13.

The drive arm 16 transmits the movement of the conveyance rack 15 to the door unit 4. The drive arm 16 is a plate-shaped member which is provided in a downward direction towards the door unit 4, from the lower surface of the right end of the conveyance rack 15. A U-shaped groove 16a into which a portion of the door unit 4 fits is provided in the lower portion of the drive arm 16.

The housing case 26 internally houses the power pinion 11, the relay pinion 12, the relay rack 13, the conversion rack 14, the conveyance rack 15, the drive arm 16, and the like. The housing case 26 is disposed above the door unit 4, and is a case having a hollow interior which is long and thin in the opening and closing direction. As described previously, the power pinion 11 and the conversion rack 14 are fixed in the housing case 26. Furthermore, a slide mechanism (not illustrated) for allowing the relay rack 13 and the conveyance rack 15 to move in the opening and closing direction is provided in the housing case 26.

The door rail 50 is a guide disposed between the housing case 26 and the door unit 4, from which the door unit 4 is hung and which allows the door unit 4 to move in the opening and closing direction. The door rail 50 is a member that is long and thin in the opening and closing direction and has a door rail groove 50a from by the door unit 4 is hung and guided.

The door unit 4 has a door panel 41, a door hanger 42 and a door coupling section 44. The door panel 41 is a door main body which is moved in an opening and closing direction by the moving body drive apparatus 2 and which closes off a corridor or entrance/exit, or the like. A shock-absorbing member 41a made from a rubber member, or the like, is attached to the right side surface portion of the door panel 41 in order to prevent accidents when the door closes.

The door hanger 42 suspends the door panel 41 from the door rail 50 and moves the door panel 41. One door hanger 42 is provided respectively at the left and right sides of the upper end of the door panel 41. The door hangers 42 each have a guide roller 45a and an adjustment roller 45b. The guide roller 45a fits into the door rail groove 50a of the door rail 50, and guides the movement of the door panel 41. The adjustment roller 45b is disposed between two guide rollers 45a, and suppresses rattling that occurs during opening and closing of the door panel 41, due to play in the engagement between the two guide rollers 45a and the door rail groove 50a.

The door coupling section 44 is provided in the upper portion of the right end of the door panel 41, and couples the door panel 41 and the drive arm 16. More specifically, a projecting section 44a is provided in the door coupling section 44, and this projecting section 44a is fitted into a U-shaped groove 16a provided in the drive arm 16.

Figure 2:
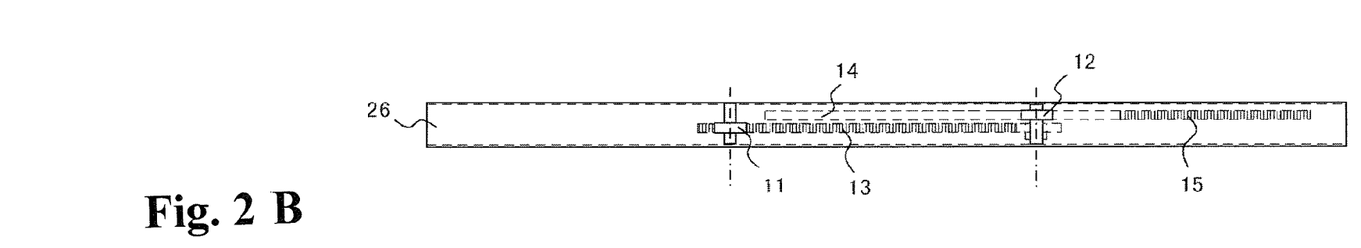

FIGS. 2A and 2B are diagrams showing a fully closed state of the door apparatus 1. FIG. 2A shows a front surface diagram and FIG. 2B shows an upper surface diagram. The relay rack 13 is moved in the closing (rightward) direction from the fully open state in FIGS. 1A and 1B, due to rotation of the power pinion 11. The relay pinion 12 is also moved in the closing direction in an integrated fashion with the relay rack 13. The conveyance rack 15 moves in the closing direction due to the rotation of the relay pinion 12 by the conversion rack 14. Consequently, the door unit 4 moves along the door rail 50 until reaching a fully closed state. A detailed description of this operation is given in FIG. 5.

Figures 3A, 3B, 3C:
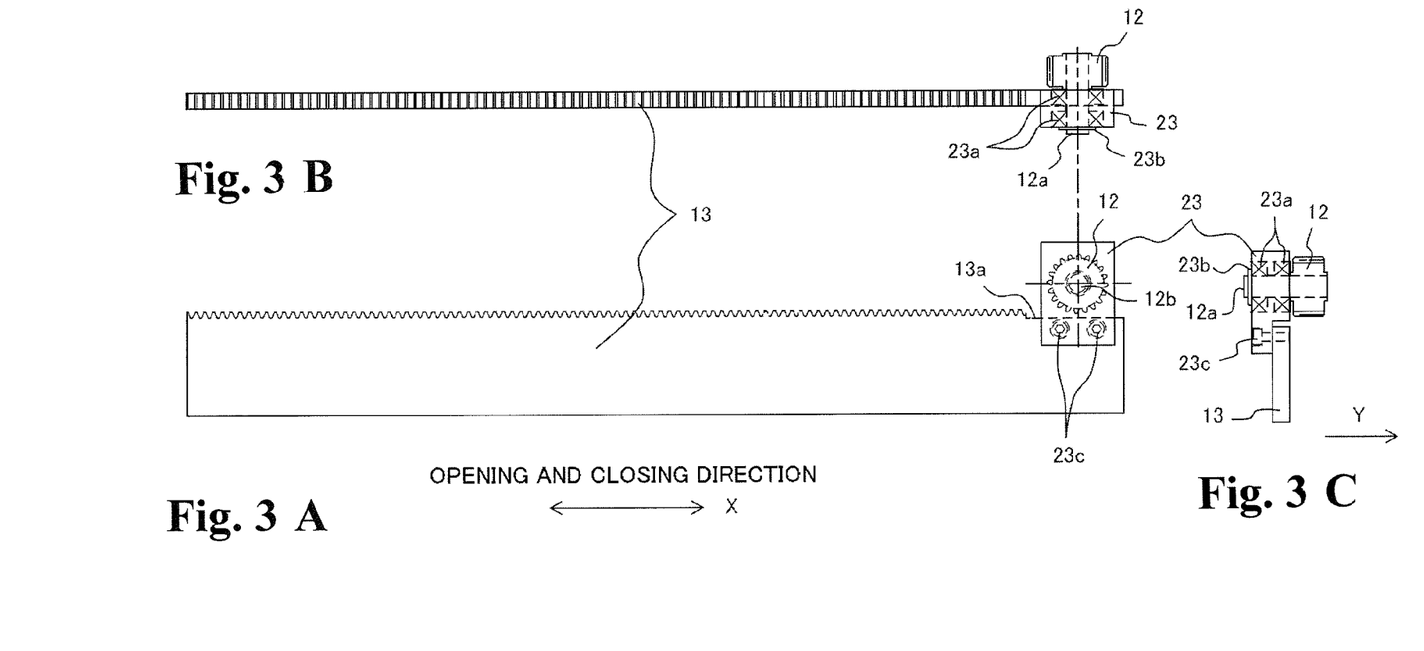

FIGS. 3A to 3C are diagrams showing an enlarged view of the relay rack 13 and the relay pinion 12. FIG. 3A is a front surface diagram in the same direction as FIG. 1A, FIG. 3B is an upper surface diagram in the same direction as the FIG. 1B, and FIG. 3C is a side face diagram. A flat installation section 13a on which no rack is formed is provided on the right end side of the upper surface of the relay rack 13, in order to install a pinion fixing section 23.

The pinion fixing section 23 is a member for rotatably fixing the relay pinion 12 to the relay rack 13. The pinion fixing section 23 is fixed to the lower side of the installation section 13a by two screws 23c.

Two bearings 23a are provided in the Y direction, in the upper side portion of the pinion fixing section 23. A pinion shaft 12a is provided in the center of the relay pinion 12. The pinion shaft 12a which projects from the relay pinion 12 is inserted into the bearing 23a, and a retaining fixture 23b is attached to a front end of the pinion shaft 12a. Consequently, the relay pinion 12 is installed rotatably on the relay rack 13.

Figure 4:
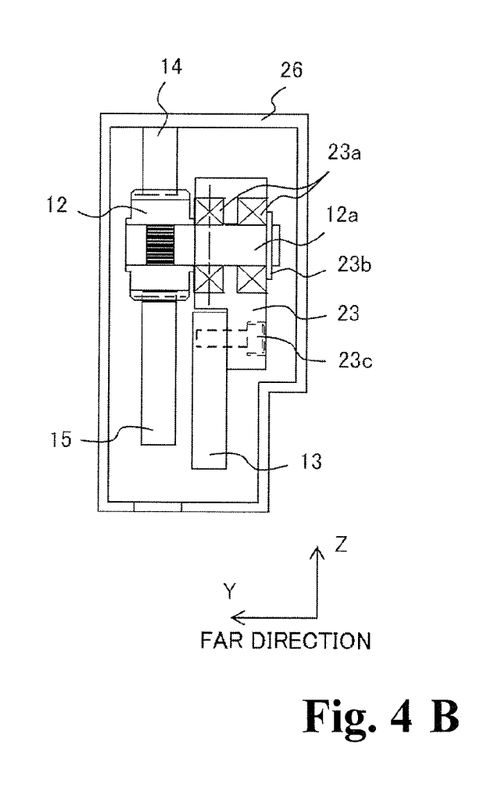
FIG. 4A is a cross-sectional diagram along the line A-A in FIG. 2A showing the portion corresponding to the power pinion 11.
FIG. 4B is a cross-sectional diagram along the line B-B in FIG. 2A showing the portion corresponding to the relay pinion 12.

FIGS. 4A and 4B are cross-sectional diagrams of the power pinion 11 and the relay pinion 12. Here, the direction from right to left is called the "far direction" (Y direction). FIG. 4A is a cross-sectional diagram along the line A-A in FIGS. 2A and 2B, which shows the portion corresponding to the power pinion 11.

The conversion rack 14 and the conveyance rack 15 are provided within the housing case 26 so as to be arranged in parallel with the relay rack 13, on the far side of the relay rack 13. The relay rack 13 and the conveyance rack 15 are provided movably in the opening and closing direction, by a slide mechanism (not illustrated) as described above. The conversion rack 14 is provided in an upper portion of the interior of the housing case 26, the conveyance rack 15 is provided in a lower portion of the interior of the housing case 26, and the conversion rack 14 and the conveyance rack 15 are provided in mutually opposing upper and lower positions. A door coupling section 44 is installed on a lower portion of the conveyance rack 15.

A groove 26a through which the moving door coupling section 44 can pass is provided on the lower surface of the housing case 26. Furthermore, the power pinion 11 is attached to a motor shaft 21a and the front end of the motor shaft 21a is supported by a bearing 21b which is provided on a side surface of the housing case 26.

FIG. 4B is a cross-sectional diagram along the line B-B in FIGS. 2A and 2B and shows a portion corresponding to the relay pinion 12. As described previously, the pinion fixing section 23 is installed on the relay rack 13 by screws 23c. The pinion shaft 12a of the relay pinion 12 is supported on the bearing 23a of the pinion fixing section 23. The upper side of the gear on the relay pinion 12 engages with the conversion rack 14, and the lower side of the gear on the relay pinion 12 engages with the conveyance rack 15. In other words, the relay pinion 12 is installed so as to be sandwiched between the conversion rack 14 and the conveyance rack 15.

Figure 5:
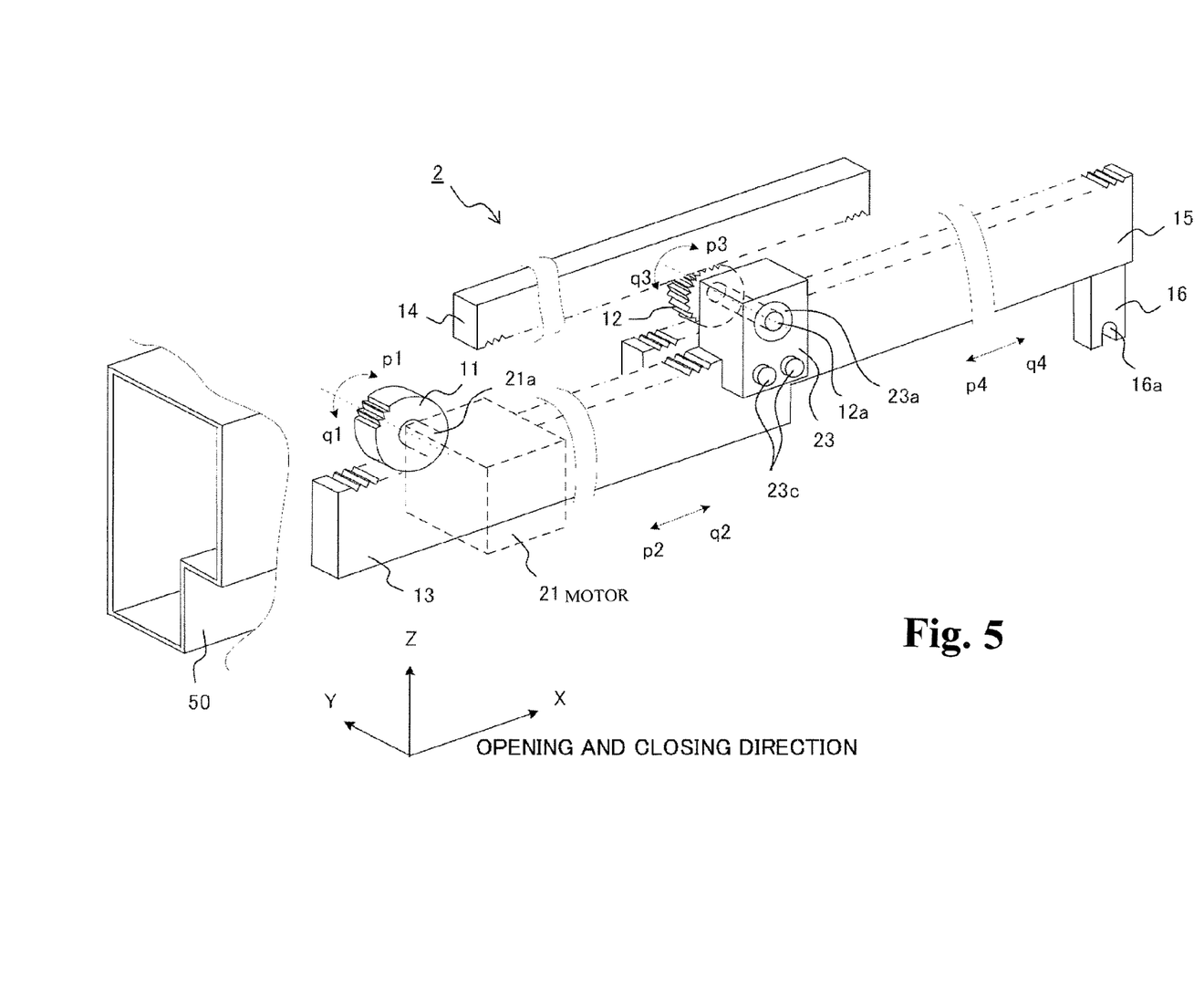
FIG. 5 is a perspective drawing showing a schematic view of a principal part of the moving body drive apparatus 2.

FIG. 5 is a perspective diagram showing a schematic view of a principal part of a moving body drive apparatus 2. FIG. 5 illustrates the operation of the power pinion 11, and the like, inside the housing case 26. The relationship of the directions with respect to FIGS. 1A and 1B is as indicated by X, Y, and Z.

A motor 21 for driving indicated by the dotted lines is fixed to the outer side of a side surface of the housing case 26. The power pinion 11 is attached to the front end of a motor shaft 21a of this motor 21. The relay rack 13, which engages with the lower side of the gear of the power pinion 11 and which can move in the opening and closing direction, is provided. The relay pinion 12 is installed rotatably on the pinion fixing section 23, at the right end of the relay rack 13.

The conversion rack 14 is provided in a parallel direction with respect to the relay rack 13, in an upper portion of the far side of the relay rack 13. The conveyance rack 15 is provided movably in the opening and closing direction, in a parallel direction with respect to the relay rack 13, on the far side of the relay rack 13. A drive arm 16 is provided to project downwards in a lower portion of the right end of the conveyance rack 15. The relay pinion 12 is sandwiched between the conversion rack 14 and the conveyance rack 15 and engages with both of these racks.

A movement from the open state in FIGS. 1A and 1B to the closed state in FIGS. 2A and 2B will now be described. The power pinion 11 is turned in the direction q1 (counter-clockwise direction) by the motor 21. Due to the rotation of the power pinion 11 in the direction q1, the relay rack 13 moves linearly in the direction q2 (closing direction) and the relay pinion 12 also moves in the direction q2. When the relay pinion 12 moves linearly in the direction q2, the relay pinion 12 also rotates in the direction q3 (counter-clockwise direction) while moving linearly in the direction q2 due to the relay pinion 12 engaging with the conversion rack 14, which is stationary.

Due to the rotation of the relay pinion 12 in direction q3, the conveyance rack 15 moves linearly in direction q4 (closing direction). Due to the movement of the conveyance rack 15 in the direction q4, the door unit 4 which is integrated with the conveyance rack 15 via the drive arm 16 moves in the closing direction (the q4 direction), and assumes a closed state.

An operation of driving conversely from the closed state to the open state will now be described. The power pinion 11 rotates in the direction p1 (clockwise direction) by the motor 21. Due to this rotation of the power pinion 11 in the direction p1, the relay rack 13 moves in direction p2, and the relay pinion 12 rotates in the direction p3 (clockwise direction) while moving in the direction p2.

Due to the rotation of the relay pinion 12 in the direction p3, the conveyance rack 15 moves in the direction p4. The door unit 4 which is integrated with the conveyance rack 15 via the drive arm 16 moves in the opening direction (p4 direction) and assumes an open state. Consequently, the door unit 4 can be opened and closed by rotation of the motor 21.

Figure 6:
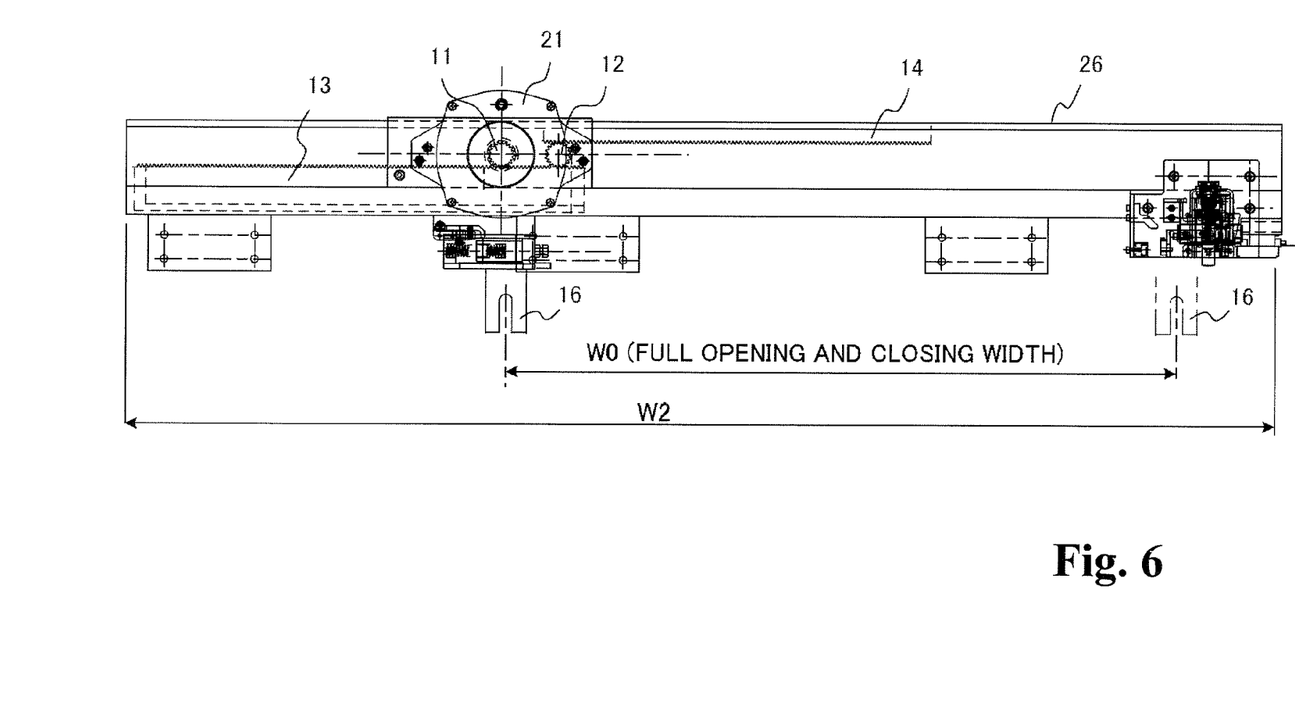
FIG. 6 is a diagram showing a concrete example of dimensions in the moving body drive apparatus 2 according to the present invention.

FIG. 6 is a diagram showing a concrete example of the dimensions of the moving body drive apparatus 2 according to the present embodiment. FIG. 6 illustrates the shortening of the total length of the moving body drive apparatus 2 with respect to the example in FIG. 9. The door unit 4 is not depicted.

In the example in FIG. 6 and the example in FIG. 9, the full opening and closing width W0 of the door is the same. The total length of the moving body drive apparatus 2 was W1 in the example in FIG. 9, and is referred as W2 in the example in FIG. 6, where W1>W2. The total length of the conveyance rack 15 is equal to or less than W0, which is the full opening and closing width W0 of the door.

As described above, in the moving body drive apparatus 2 according to the present embodiment, the relay pinion 12 which moves the conveyance rack 15 for driving the door unit 4 rotationally drives the conveyance rack 15 while moving in the direction of movement of the door unit 4. Therefore, it is possible to shorten the length of the rack which has been required conventionally to be the full length of movement of the door unit 4. By shortening the required length, including the amount of movement of the conveyance rack, it is possible to shorten the total length of the moving body drive apparatus 2.

Furthermore, the relay linear body which is illustrated as a relay rack should require a function for moving the relay pinion in the direction of travel. However, the present invention is not limited to having the form of a rack. For example, it is also possible to cause the relay pinion to move linearly by means of a common belt, a lead screw or a linear motor, or the like.

Moreover, in the embodiment described above, the gear surface is disposed in a horizontal direction in the example of every rack, but the invention is not limited to this and the gear surface may also be disposed in a vertical direction.

Furthermore, the moving body drive apparatus described above is not limited to a door opening and closing apparatus in which the moving body is a door, and may also be applied to a case in which the moving body is a cargo and the moving body drive apparatus is an apparatus which conveys the cargo.

The present invention is not limited directly to the embodiment described above, and can also be implemented by modifying the constituent elements within a range that does not depart from the essence of the invention. Furthermore, it is also possible to create various inventions by a suitable combination of a plurality of constituent elements disclosed in the embodiments given above. For example, it is possible to suitably combine all of the constituent elements indicated in the embodiment. Moreover, it is also possible to suitably combine constituent elements from different embodiments. Various modifications and adaptations are of course possible within a range that does not depart from the essence of the invention.

EXPLANATION OF REFERENCE NUMERALS 1 door apparatus
2 moving body drive apparatus
4 door unit
11 power pinion
12 relay pinion
12a pinion shaft
13 relay rack
13a attachment section
14 conversion rack
15 conveyance rack
16 drive arm
21 motor
21a motor shaft
22 bearing
23 pinion fixing section
23a bearing
23b retaining fixture
23c screw
26 housing case
41 door panel
42 door hanger
44 door coupling section
45a guide roller
50 door rail
50a door rail groove
100 door apparatus
102 door panel
104 housing case
106 door rail
108 drive arm
110 door coupling section
112 door hanger
114 pinion
116 rack
118 roller
120 motor

What is claimed is:

1. A combination comprising one moving body and one moving body drive apparatus driving the moving body in a linear direction by a drive source, the moving body drive apparatus comprising:
    a housing case;
    a relay linear body movably disposed in the housing case along a traveling direction of the moving body by the drive source, and having a relay rotating body disposed at an end portion thereof in the traveling direction and supported rotatably in a direction perpendicular to the traveling direction to relay drive power to the moving body;
    a rotation converting body fixed to the housing case and engaging with an outer circumference of the relay rotating body, the rotation converting body converting a movement of the relay rotating body moved in the traveling direction of the moving body into a rotation of the relay rotating body; and
    a conveyance linear body coupled to the moving body and engaging with the outer circumference of the relay rotating body, the conveyance linear body moving in the traveling direction of the moving body by the relay rotating body rotating while being moved in the traveling direction of the moving body; and
    wherein the relay linear body, the relay rotating body, and the conveyance linear body are housed within the housing case.

2. The combination according to claim 1, wherein the moving body drive apparatus further comprises a drive power rotating body attached to the drive source and engaging with the relay linear body for transmitting the drive power from the drive source.

3. The combination according to claim 2, wherein the drive power rotating body is a pinion provided in a rotating shaft of the drive source,
    the relay rotating body is a pinion,
    the relay linear body is a rack engaging with the relay rotating body,
    the rotation converting body is a rack engaging with the relay rotating body, and
    the conveyance linear body is a rack engaging with the relay rotating body.

4. The combination according to claim 2, wherein the moving body drive apparatus is configured so that when the drive power rotating body is rotated by the driving source,
    the relay linear body is moved linearly in the traveling direction,
    the relay rotating body fixed to the relay linear body and engaged with the conveyance linear body is rotated simultaneously in a direction same as the drive power rotating body, and
    the moving body coupled to the conveyance linear body moves linearly in the traveling direction.

5. The combination according to claim 4, wherein the relay linear body is disposed adjacent and parallel to the conveyance linear body in a width direction of the conveyance linear body, and
    the rotation converting body is disposed above the conveyance linear body and facing the conveyance linear body so that the relay rotating body rotates between the rotation converting body and the conveyance linear body.

6. The combination according to claim 5, wherein the relay linear body includes a fixing section fixed to the one end thereof to rotatably hold the relay rotating body through a shaft extending from the relay linear body toward the conveyance linear body so that the relay rotating body is engaged between the rotation converting body and the conveyance linear body.

7. The combination according to claim 1, wherein the rotation converting body is a rack,
    the conveyance linear body is a rack engaging with the relay rotating body, and
    the relay rotating body is a pinion provided so as to be sandwiched between the rotation converting body and the conveyance linear body.

8. The combination according to claim 1, wherein a total length of the conveyance linear body is shorter than a total movement length of the moving body.

9. The combination to claim 1, wherein the moving body is a door being opened and closed.

10. The combination according to claim 1, wherein said combination consists of said one moving body and said one moving body drive apparatus.

\* \* \* \* \*

UNITED STATES PATENT AND TRADEMARK OFFICE
CERTIFICATE OF CORRECTION

| | | |
|---|---|---|
| PATENT NO. | : 9,003,708 B2 | Page 1 of 1 |
| APPLICATION NO. | : 14/171830 | |
| DATED | : April 14, 2015 | |
| INVENTOR(S) | : Takahiro Shiroma | |

It is certified that error appears in the above-identified patent and that said Letters Patent is hereby corrected as shown below:

In the Specification,

Change column 5, line 7, from "(nod illustrated)" to --(not illustrated)--.

In the Claims,

Change column 11, line 4, from "9. The combination to claim 1" to --9. The combination according to claim 1--.

Signed and Sealed this
Twenty-first Day of July, 2015

Michelle K. Lee
*Director of the United States Patent and Trademark Office*